United States Patent
Uefuji et al.

(10) Patent No.: US 10,659,287 B2
(45) Date of Patent: May 19, 2020

(54) MANAGEMENT SERVER

(71) Applicant: DENSO CORPORATION, Kariya, Aichi-pref. (JP)

(72) Inventors: Takashi Uefuji, Chiryu (JP); Hiroki Ukai, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 511 days.

(21) Appl. No.: 14/402,655

(22) PCT Filed: May 16, 2013

(86) PCT No.: PCT/JP2013/003125
§ 371 (c)(1),
(2) Date: Nov. 20, 2014

(87) PCT Pub. No.: WO2013/175738
PCT Pub. Date: Nov. 28, 2013

(65) Prior Publication Data
US 2015/0156058 A1 Jun. 4, 2015

(30) Foreign Application Priority Data

May 23, 2012 (JP) .................. 2012-117501
Feb. 27, 2013 (JP) .................. 2013-037117

(51) Int. Cl.
*H04L 12/24* (2006.01)
*H04L 29/08* (2006.01)
(Continued)

(52) U.S. Cl.
CPC ............ *H04L 41/046* (2013.01); *G06F 21/10* (2013.01); *H04L 67/12* (2013.01)

(58) Field of Classification Search
CPC ............................. H04L 41/046; H04L 67/12
(Continued)

(56) References Cited

U.S. PATENT DOCUMENTS 5,910,987 A  6/1999 Ginter et al.
5,915,019 A  6/1999 Ginter et al.
(Continued)

FOREIGN PATENT DOCUMENTS

JP  2000207219 A  7/2000
JP  2005284506 A  10/2005
(Continued)

OTHER PUBLICATIONS

US 6,516,250 B1, 02/2003, Hayashi et al. (withdrawn)
(Continued)

*Primary Examiner* — Kevin T Bates
*Assistant Examiner* — Mark A Scott
(74) *Attorney, Agent, or Firm* — Harness, Dickey & Pierce, P.L.C.

(57) ABSTRACT

A management server capable of improving the convenience of a content distribution service for a user who purchases a vehicular device is disclosed. The management server manages provision of a content distribution service for content execution device, which includes a vehicular device and a mobile communication terminal each installed with a cooperative application to execute content based on mutual cooperation. When user identification information transmitted from the content execution device may match user identification information managed by the user identification information management portion, the management server permits provision of the content distribution service for the content execution device regardless of whether or not a vehicular device included in the content execution device is registered.

14 Claims, 11 Drawing Sheets

(51) Int. Cl.
- *G06F 7/00* (2006.01)
- *G08B 21/00* (2006.01)
- *G06F 17/00* (2019.01)
- *G06F 21/10* (2013.01)

(58) Field of Classification Search
USPC ........................................................ 709/223
See application file for complete search history.

(56) References Cited

U.S. PATENT DOCUMENTS

| | | | |
|---|---|---|---|
| 5,917,912 A | 6/1999 | Ginter et al. | |
| 6,301,603 B1* | 10/2001 | Maher | G06F 9/5044 700/94 |
| 6,647,322 B1 | 11/2003 | Hayashi et al. | |
| 7,516,301 B1* | 4/2009 | Moreton | G06F 9/5061 712/28 |
| 8,073,590 B1* | 12/2011 | Zilka | H04M 1/6083 340/572.3 |
| 8,848,608 B1* | 9/2014 | Addepalli | H04W 4/046 370/328 |
| 8,977,408 B1* | 3/2015 | Cazanas | H04L 41/082 455/3.03 |
| 9,032,296 B1* | 5/2015 | Jeffs | G06F 9/451 715/719 |
| 2002/0103578 A1 | 8/2002 | Hayashi et al. | |
| 2002/0103579 A1 | 8/2002 | Hayashi et al. | |
| 2003/0103482 A1* | 6/2003 | Van Bosch | H04L 29/06 370/338 |
| 2003/0139857 A1 | 7/2003 | Hayashi et al. | |
| 2004/0054923 A1* | 3/2004 | Seago | H04L 63/102 726/4 |
| 2005/0027787 A1 | 2/2005 | Kuhn et al. | |
| 2005/0060067 A1* | 3/2005 | Nishida | B60R 16/0231 701/2 |
| 2005/0177284 A1* | 8/2005 | Kugumiya | H04L 63/0428 701/1 |
| 2005/0246069 A1 | 11/2005 | Hayashi et al. | |
| 2006/0122743 A1 | 6/2006 | Hayashi et al. | |
| 2006/0122744 A1 | 6/2006 | Hayashi et al. | |
| 2007/0208496 A1* | 9/2007 | Downs | G08G 1/0112 701/117 |
| 2007/0287439 A1* | 12/2007 | Weyl | G06F 8/65 455/420 |
| 2008/0104201 A1 | 5/2008 | Moon et al. | |
| 2008/0274688 A1* | 11/2008 | Kirby | H04N 7/1675 455/3.06 |
| 2009/0005070 A1* | 1/2009 | Forstall | G01C 21/12 455/456.1 |
| 2009/0076637 A1* | 3/2009 | Kameyama | G06F 17/30766 700/94 |
| 2009/0254916 A1* | 10/2009 | Bose | G06F 16/2455 718/104 |
| 2009/0306834 A1* | 12/2009 | Hjelm | H04L 12/2809 701/1 |
| 2010/0073125 A1* | 3/2010 | Alrabady | H04L 9/3247 340/5.2 |
| 2010/0094900 A1* | 4/2010 | Hughes, Jr. | G06F 16/40 707/770 |
| 2010/0138149 A1* | 6/2010 | Ohta | G01C 21/26 701/533 |
| 2010/0138828 A1* | 6/2010 | Hanquez | G06F 9/45533 718/1 |
| 2010/0228404 A1* | 9/2010 | Link, II | G06F 9/44542 701/1 |
| 2010/0235891 A1* | 9/2010 | Oglesbee | H04L 67/1095 726/5 |
| 2010/0241857 A1* | 9/2010 | Okude | B60R 25/24 713/168 |
| 2010/0280956 A1* | 11/2010 | Chutorash | G06Q 20/20 705/64 |
| 2010/0318636 A1* | 12/2010 | Matsumura | G06F 21/6218 709/220 |
| 2010/0332613 A1* | 12/2010 | Brakensiek | G06F 9/452 709/217 |
| 2010/0333129 A1* | 12/2010 | Alhadeff | G06Q 30/02 725/27 |
| 2011/0176524 A1* | 7/2011 | Fasbender | H04L 12/2809 370/338 |
| 2011/0184789 A1* | 7/2011 | Kirsch | G06Q 30/0207 705/14.1 |
| 2011/0258221 A1* | 10/2011 | Furuta | H04W 4/046 707/769 |
| 2011/0275358 A1* | 11/2011 | Faenger | H04W 8/24 455/420 |
| 2011/0301839 A1* | 12/2011 | Pudar | H04W 4/04 701/408 |
| 2012/0041675 A1* | 2/2012 | Juliver | G06Q 10/08 701/465 |
| 2012/0046808 A1* | 2/2012 | Furuta | G01C 21/362 701/2 |
| 2012/0046864 A1* | 2/2012 | Zilka | G01C 21/362 701/533 |
| 2012/0078493 A1* | 3/2012 | Schunder | G01C 21/32 701/117 |
| 2012/0078512 A1* | 3/2012 | Schunder | G01C 21/32 701/446 |
| 2012/0079002 A1* | 3/2012 | Boll | G06F 9/452 709/203 |
| 2012/0095957 A1* | 4/2012 | Reddy | G06F 16/256 707/602 |
| 2012/0117198 A1* | 5/2012 | Bolduc | G06F 9/541 709/219 |
| 2012/0124591 A1* | 5/2012 | Cadambi | G06F 9/505 718/103 |
| 2012/0159170 A1* | 6/2012 | Lee | H04W 12/02 713/169 |
| 2012/0197523 A1* | 8/2012 | Kirsch | G01C 21/362 701/426 |
| 2012/0254948 A1* | 10/2012 | Kleve | H04L 9/3215 726/4 |
| 2012/0329520 A1* | 12/2012 | Akama | G01C 21/3688 455/557 |
| 2013/0019279 A1* | 1/2013 | Aida | H04W 4/003 726/3 |
| 2013/0090845 A1* | 4/2013 | Wakayanagi | G01C 21/367 701/411 |
| 2013/0099915 A1* | 4/2013 | Prasad | B60R 16/02 340/461 |
| 2013/0137476 A1* | 5/2013 | Kawaguchi | H04W 4/08 455/519 |
| 2013/0211623 A1* | 8/2013 | Thompson | G07C 5/008 701/2 |
| 2013/0226369 A1* | 8/2013 | Yorio | G06F 17/00 701/1 |
| 2013/0261888 A1* | 10/2013 | Nagai | G06F 17/00 701/36 |
| 2013/0276141 A1* | 10/2013 | Chen | H04N 21/43622 726/28 |
| 2013/0281021 A1* | 10/2013 | Palin | H04W 8/005 455/41.2 |
| 2013/0297100 A1* | 11/2013 | Petersen | G06F 17/00 701/2 |
| 2013/0297456 A1* | 11/2013 | Annan | G06Q 30/06 705/26.81 |
| 2014/0059017 A1* | 2/2014 | Chaney | G06F 7/08 707/692 |
| 2014/0059056 A1* | 2/2014 | Chaney | G06F 16/24578 707/749 |
| 2014/0164579 A1* | 6/2014 | Douthitt | G07C 5/008 709/219 |
| 2014/0204832 A1* | 7/2014 | Van Phan | H04W 16/26 370/315 |
| 2014/0278781 A1* | 9/2014 | Liu | G06Q 30/0203 705/7.32 |
| 2014/0330453 A1* | 11/2014 | Nakagawa | B60H 1/00428 701/2 |

(56) References Cited

U.S. PATENT DOCUMENTS

| | | | | |
|---|---|---|---|---|
| 2014/0331129 | A1* | 11/2014 | Saeki | G06F 3/016 |
| | | | | 715/702 |
| 2014/0379169 | A1* | 12/2014 | Camacho | B60R 16/037 |
| | | | | 701/2 |
| 2015/0127210 | A1* | 5/2015 | Suzuki | B60K 35/00 |
| | | | | 701/29.1 |

FOREIGN PATENT DOCUMENTS

| | | |
|---|---|---|
| JP | 2008092575 A | 4/2008 |
| JP | 4237802 B2 | 3/2009 |
| JP | 2010026104 A | 2/2010 |
| JP | 4511240 B2 | 7/2010 |
| JP | 2010193187 A | 9/2010 |
| JP | 2010199718 A | 9/2010 |
| JP | 2011180888 A | 9/2011 |

OTHER PUBLICATIONS

International Search Report and Written Opinion (in Japanese with English Translation) for PCT/JP2013/003125, dated Jul. 16, 2013; ISA/JP.

* cited by examiner

MANAGEMENT SERVER

CROSS REFERENCE TO RELATED APPLICATIONS

This application is a U.S. National Phase Application under 35 U.S.C. 371 of International Application No. PCT/JP2013/003125 filed on May 16, 2013 and published in Japanese as WO 2013/175738 A1 on Nov. 28, 2013. This application is based on and claims the benefit of priority from Japanese Patent Applications No. 2012-117501 filed on May 23, 2012, and No. 2013-037117 filed on Feb. 27, 2013. The entire disclosures of all of the above applications are incorporated herein by reference.

TECHNICAL FIELD

The present disclosure relates to a management server that provides a content distribution service for distributing contents to a content execution device and that manages a target of content distribution service provision.

BACKGROUND ART

Conventionally, there is provided a technology that distributes contents to various devices from a contents server as disclosed in patent literature 1.

PRIOR ART LITERATURES

Patent Literature

[Patent Literature 1]
JP-2008-92575A (corresponding to US 2008/0104201A)

SUMMARY OF INVENTION

The applicant is making an attempt to develop a system that provides a content distribution service for a content execution device, which includes a vehicular device and a mobile communication terminal. Concerning the development, the applicant is interested in improving the convenience of the content distribution service for users who purchase a vehicular device provided by the applicant. The use of a content distribution service may be registered by managing the correspondence between identification information about a vehicular device and identification information about a user. In such a case, the content distribution service may be permitted for use only when the content distribution service is used from a vehicular device (a vehicular device included in the content execution device) registered by the user. For example, the user may wish to receive the service using a vehicular device (unregistered vehicular device) different from the registered vehicular device. According to that method, however, the user needs to register the service anew using the unregistered vehicular device. This makes the registration procedure complicated and degrades the convenience.

The present disclosure has been made in consideration of the foregoing. It is an object of the disclosure to provide a management server capable of improving the convenience of a content distribution service for a user who purchases a vehicular device included in content execution device.

A management server according to an example of the present disclosure manages provision of a content distribution service for a content execution device, which includes a vehicular device and a mobile communication terminal each installed with a cooperative application to execute content based on mutual cooperation. The management server includes a registered vehicular device enabling portion and a user identification information management portion. The registered vehicular device enabling portion configures the vehicular device included in the content execution device as a registered vehicular device when the content execution device starts the cooperative application for the first time. The user identification information management portion manages user identification information in association with vehicular device identification information to identify the registered vehicular device. The user identification information is entered when the content execution device including the registered vehicular device starts the cooperative application for the first time.

User identification information transmitted from the content execution device may match user identification information managed by the user identification information. In such a case, the management server permits provision of the content distribution service for the content execution device regardless of whether or not a vehicular device included in the content execution device is assumed to be the registered vehicular device.

According to the management server, a user needs to at least register his or her user identification information using a vehicular device he or she purchases or using the content execution device including the vehicular device. After that, the user can use the content distribution service also using the content execution device including an unregistered vehicular device (a vehicular device other than the vehicular device he or she purchased). The user need not afresh register the use of the content distribution service using the unregistered vehicular device or using the content execution device including the unregistered vehicular device. This can improve convenience of the content distribution service to be used by users who purchases the vehicular device included in the content execution device.

BRIEF DESCRIPTION OF DRAWINGS

The foregoing and other objects, features, and advantages of the present disclosure will become more apparent from the below detailed description made with reference to the accompanying drawings, in which.

EMBODIMENTS FOR CARRYING OUT INVENTION

Figure 1:
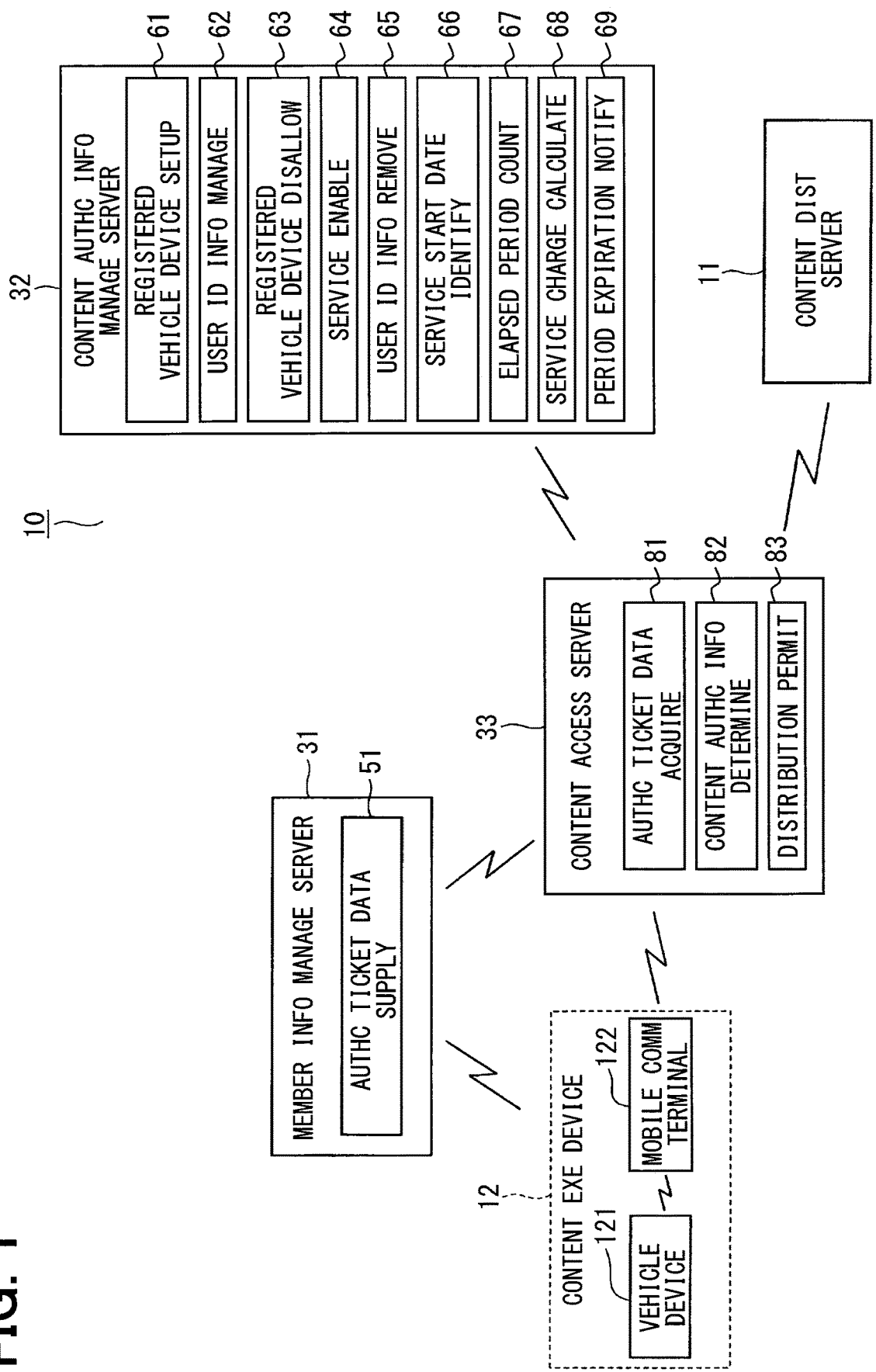
FIG. 1 is a diagram schematically illustrating an outline configuration of a management system according to an embodiment.

One embodiment of the disclosure will be explained with reference to drawings. As illustrated in FIG. 1, a management server 10 manages the use of a content distribution service that distributes contents to a content execution device 12 from a content distribution server 11. The management server 10 includes a member information management server 31, a content authentication information management server 32, and a content access server 33. The member information management server 31 is owned by a third party other than the applicant and manages member information. The content authentication information management server 32 and the content access server 33 are owned by the applicant and manage the content distribution service. According to the embodiment, multiple servers (the content authentication information management server 32 and the content access server 33 in this example) function as a relay server to relay distribution of contents from the content distribution server 11 to the content execution device 12.

As will be described in detail later, the content distribution server 11 receives a content distribution request from the authenticated content execution device 12. The content distribution server 11 then distributes various contents to the content execution device 12 indirectly via the content access server 33 or directly without using the content access server 33. The content distribution server 11 distributes streaming and non-streaming contents. The streaming contents include music content to replay music and Internet radio content to provide an Internet radio service, for example. The non-streaming contents include facility search content to provide a facility search service to search for restaurants or tourist facilities, news distribution content to distribute news, and SNS service content to provide a social networking service, for example.

The content execution device 12 includes a vehicular device 121 mounted on a vehicle, and a mobile communication terminal 122 communicably connected to the vehicular device 121. The vehicular device 121 includes a navigation system, for example. The vehicular device 121 is assigned a vehicular device ID to identity the vehicular device 121. The vehicular device ID exemplifies vehicular device identification information. When brought into a vehicle compartment, the mobile communication terminal 122 is communicably connected to the vehicular device 121 via a wireless communication line. The wireless communication line may be provided as Bluetooth (registered trademark) communication line, for example. The vehicular device 121 and the mobile communication terminal 122 will be described later.

The member information management server 31 manages member information specified by a user who wishes to use services (not limited to the content distribution service) provided from a third party as an owner of the member information management server 31. In this case, the user who wishes to use the content distribution service provided from the applicant registers the member information to the member information management server 31. The member information includes a cooperative application startup user ID and a password to start a cooperative application to be described later in detail. The member information just needs to be capable of identifying a registered member and is not limited to the user ID or the password. The user accesses an exclusive member information registration site using his or her mobile communication terminal 122 or information terminal such as a personal computer (not shown). From that site, the user can register the member information (the cooperative application startup user ID and the password in this case) to the member information management server 31.

The member information management server 31 virtually implements an authentication ticket data supply processor 51 as software. For this purpose, a controller (not shown) to control entire operation of the member information management server 31 executes a computer program.

The authentication ticket data supply processor 51 supplies authentication ticket data to the content execution device 12 used to input the member information that matches the member information managed by the member information management server 31, namely, to the mobile communication terminal 122 included in the content execution device 12 in this case. The authentication ticket can be attached with various types of data such as member information data indicating the matching member information and certificate data to certify that the authentication ticket is issued from the member information management server 31.

Figure 2:
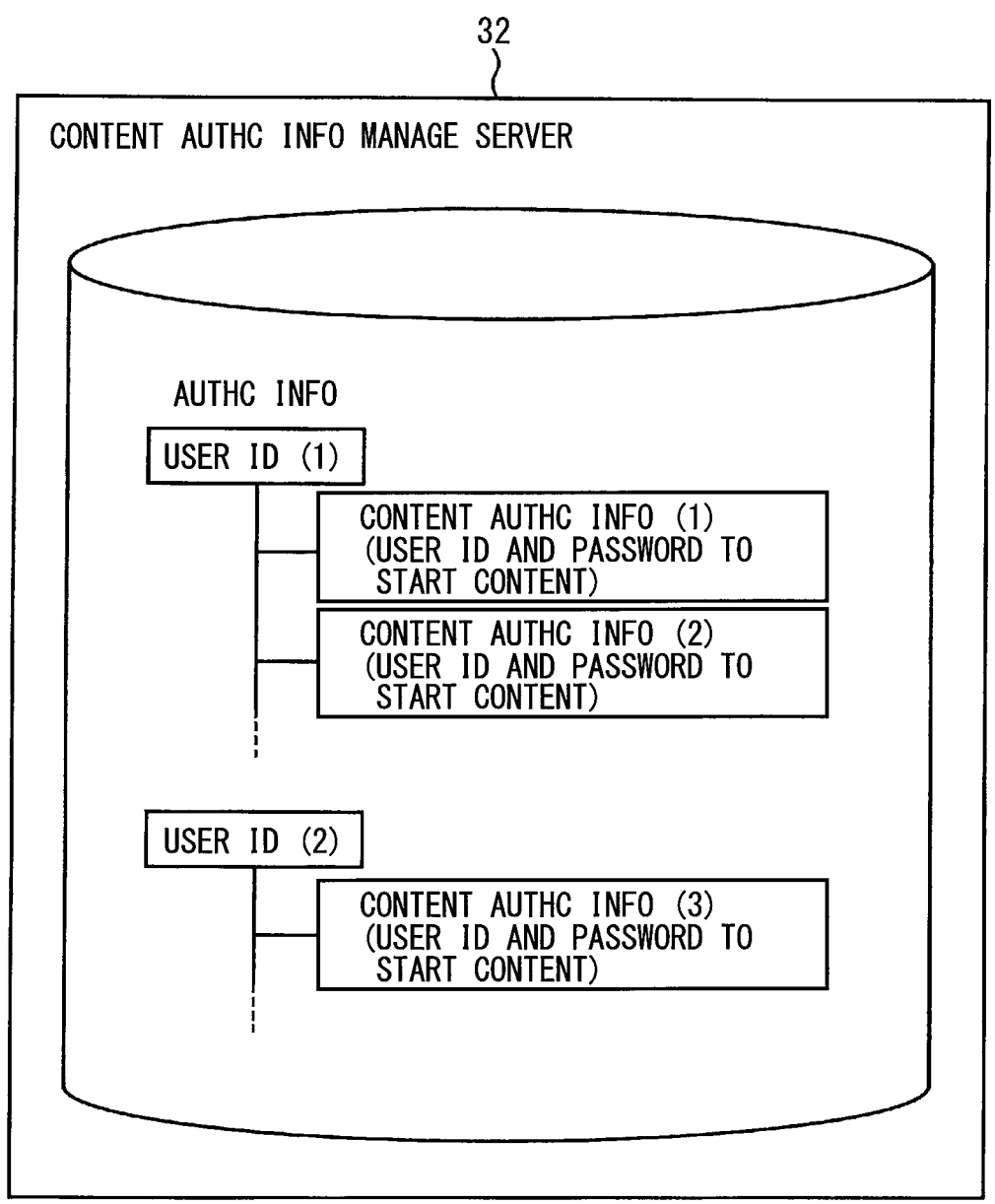
FIG. 2 is a diagram illustrating a data structure of authentication information managed by a content authentication information management server.

As illustrated in FIG. 2, for example, the content authentication information management server 32 manages content authentication information the user specifies as needed to use the content distribution service. In this case, the content authentication information corresponds to the contents startup user ID and password required to use (start) contents on a cooperative application. Namely, the content authentication information is required to use (start) contents which the content distribution service distributes to the content execution device 12 from the content distribution server 11. The content authentication information management server 32 previously acquires at least a user identification user ID (cooperative application startup user ID) included in the member information managed by the member information management server 31. The content authentication information management server 32 always or periodically accesses the member information management server 31 and acquires the most recent member information (at least the cooperative application startup user ID) managed by the member information management server 31. The content authentication information management server 32 manages the content authentication information in association with the cooperative application startup user ID included in the member information acquired from the member information management server 31.

The user can access a dedicated content authentication information registration site using his or her mobile communication terminal 122 or information terminal such as a personal computer (not shown) and register the content authentication information (content startup user ID and password in this case) to the content authentication information management server 32 from that site.

As software, the content authentication information management server 32 virtually implements a registered vehicular device enabling processor 61, a user identification information management processor 62, a registered vehicular device disabling processor 63, a service enabling processor 64, a user identification information removal processor 65, a service start date identification processor 66, an elapsed period count processor 67, a service charge calculation processor 68, and a period expiration notification processor 69. For this purpose, a controller (not shown) to control entire operation of the content authentication information management server 32 executes a computer program. The registered vehicular device enabling processor 61 exemplifies a registered vehicular device enabling means and a registered vehicular device enabling portion. The user identification information management processor 62 exemplifies a user identification information management means and a user identification information management portion.

When a cooperative application starts for the first time on the content execution device 12, the registered vehicular device enabling processor 61 configures the vehicular device 121 included in the content execution device 12 as a registered vehicular device 121A capable of using the content distribution service. The registered vehicular device enabling processor 61 enables an availability flag for the vehicular device configured as the registered vehicular device 121A. The availability flag indicates that the content distribution service is available. When the cooperative application starts on the content execution device 12, the content execution device 12 transmits a vehicular device ID (vehicular device identification information) to the content authentication information management server 32. The vehicular device ID is provided for the vehicular device 121 included in the content execution device 12.

The user identification information management processor 62 manages the cooperative application startup user ID (user identification information) in association with the vehicular device ID of the registered vehicular device 121A. The cooperative application startup user ID is input when the cooperative application starts for the first time on the content execution device 12 including the vehicular device 121 configured as the registered vehicular device 121A. When the cooperative application starts on the content execution device 12 and the cooperative application startup user ID is input, the content execution device 12 transmits the input cooperative application startup user ID to the content authentication information management server 32. Another cooperative application startup user ID may be input subsequently when the cooperative application starts on the content execution device 12 including the registered vehicular device 121A. This user ID differs from the one that was input to start the cooperative application for the first time on the content execution device 12 including the registered vehicular device 121A. In such a case, the user identification information management processor 62 manages the other cooperative application startup user ID in association with the vehicular device ID (vehicular device identification information) of the registered vehicular device 121A. When the cooperative application startup user ID is input at application startup, the content execution device 12 transmits the input cooperative application startup user ID to the content authentication information management server 32 each time the cooperative application starts on the content execution device 12.

Figure 3:
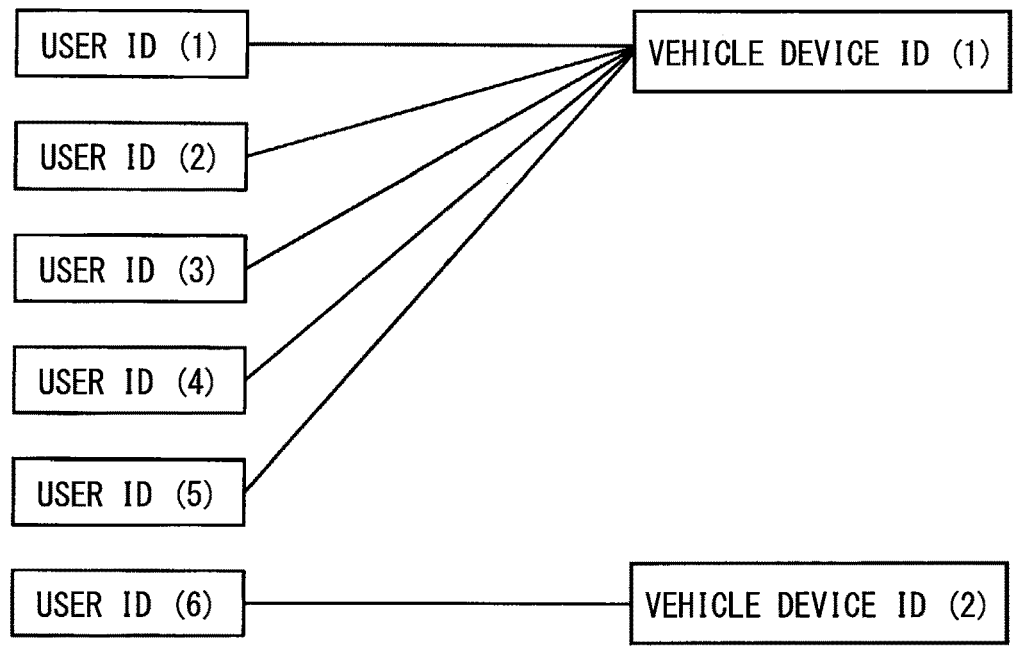
FIG. 3 is a diagram illustrating a relationship between a registered vehicular device ID and user IDs.

As illustrated in FIG. 3, the user identification information management processor 62 manages the vehicular device ID of one registered vehicular device in association with the specified number of cooperative application startup user IDs. The specified number of cooperative application startup user IDs can be changed as needed and is set to "5" in this example. In this case, user ID (6) cannot be managed in association with vehicular device ID (1). To solve this, an activation process (to be described later in detail) for other vehicular devices associates user ID (6) with another vehicular device ID (e.g., vehicular device ID (2)).

There may be a content execution device that differs from the content execution device 12 including the registered vehicular device 121A. Namely, the different content execution device includes a vehicular device different from the registered vehicular device 121A. The different content execution device may start the cooperative application in response to input of the cooperative application startup user ID managed by the user identification information management processor 62. In such a case, the registered vehicular device disabling processor 63 inhibits the registered vehicular device enabling processor 61 from enabling a vehicular device included in the content execution device as a registered vehicular device.

Figure 4:
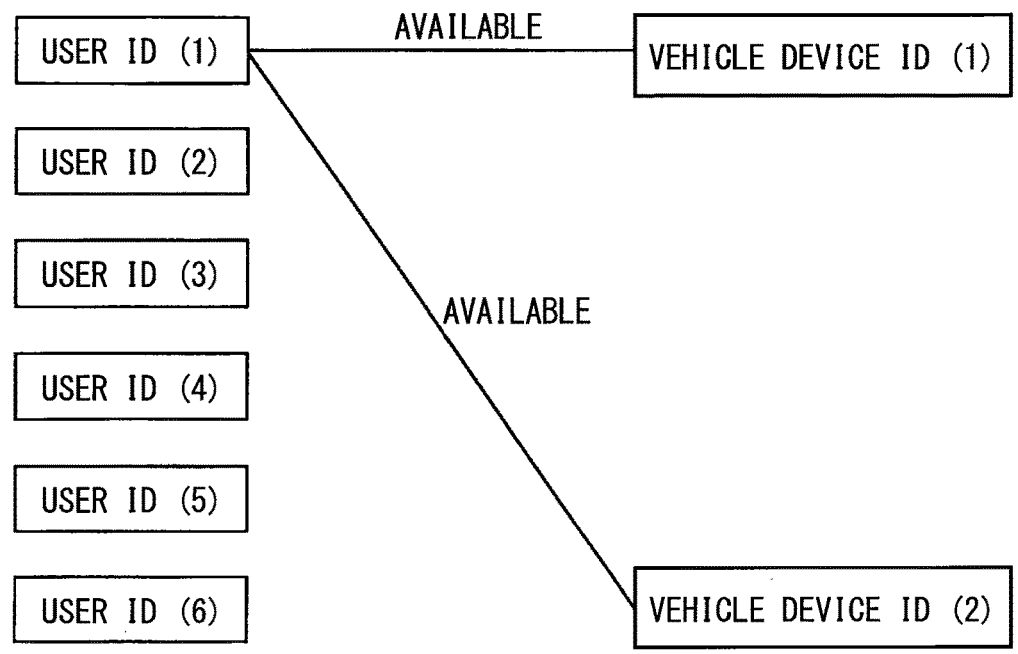
FIG. 4 is a diagram illustrating a relationship between a registered user ID and a vehicular device ID of a vehicular device capable of using a content distribution service.

The content execution device may start the cooperative application in response to input of the cooperative application startup user ID managed by the user identification information management processor 62. In such a case, the service enabling processor 64 enables the content distribution service to be available for the content execution device regardless of whether or not a vehicular device included in the content execution device is enabled as a registered vehicular device. As illustrated in FIG. 4, the cooperative application starts in response to input of a cooperative application startup user ID managed in association with the vehicular device ID of a given registered vehicular device, namely, input of user ID (1) managed in association with vehicular device ID (1) according to the example in FIG. 4. The content execution device including the vehicular device can be provided with the content distribution service even if the vehicular device to start the cooperative application (the vehicular device assigned vehicular device ID (2) in this case) is not enabled as a registered vehicular device.

The user identification information removal processor 65 removes a cooperative application startup user ID managed by the user identification information management processor 62. Specifically, the user identification information removal processor 65 removes a user ID (selected by the content execution device 12 to be described later in detail) specified by a user identification information removal instruction signal (removal request) transmitted from the content execution device 12.

The service start date identification processor 66 specifies the date to start using or providing the content distribution service when storing the vehicular device ID of the registered vehicular device 121A. The date indicates when the cooperative application starts for the first time on the content execution device 12 including the registered vehicular device 121A.

The elapsed period count processor 67 counts (monitors) a period elapsed from the service start date specified by the service start date identification processor 66 based on clocking processing of a timer (not shown).

The service charge calculation processor 68 calculates a content distribution service charge applied to the content execution device 12 including the registered vehicular device 121A based on predetermined fee structure data. The content distribution service is charged until the elapsed period counted by the elapsed period count processor 67 exceeds a predetermined period. The predetermined period can be specified on a day, month, or year basis, for example. In the example, the predetermined period is specified as "three years." The predetermined fee structure can be variously specified such as free or discount. In the example, the fee structure is specified as "free." According to the example, the service charge is applied to the content execution device 12 including the registered vehicular device 121A based on the fee structure that is free for three years from the date to start using the content distribution service. After the predetermined period has elapsed from the date to start using the content distribution service, newly installing the paid version of cooperative application allows the content execution device 12 including the registered vehicular device 121A to use the content distribution service on a paid basis.

The period expiration notification processor 69 notifies the content execution device 12 of period expiration notification data when the elapsed period counted by the elapsed period count processor 67 exceeds the predetermined period. The period expiration notification data indicates that the predetermined period has elapsed from the date to start using the content distribution service. In this case, the period expiration notification processor 69 notifies the period expiration notification data to the mobile communication terminal 122 included in the content execution device 12 only when the mobile communication terminal 122 starts the cooperative application for the first time after the elapsed period exceeds the predetermined period. The mobile communication terminal 122 thereby enables audiovisual output based on the period expiration notification data only when the mobile communication terminal 122 starts the cooperative application for the first time after the elapsed period from the date to start using the content distribution service exceeds the predetermined period. This notification process is output to the user via a notification portion provided for the mobile communication terminal 122. As will be described later in detail, the notification portion includes an audio processor 44 and a display output portion 45 and exemplifies a notification means.

The period expiration notification processor 69 notifies the vehicular device 121 of the period expiration notification data each time the vehicular device 121 starts the cooperative application after the elapsed period exceeds the predetermined period. The vehicular device 121 thereby enables audiovisual output based on the period expiration notification data each time the vehicular device 121 starts the cooperative application after the elapsed period from the date to start using the content distribution service exceeds the predetermined period. This notification process is output to the user via a notification portion provided for the vehicular device 121. As will be described later in detail, the notification portion includes an audio processor 24 and a display output portion 25.

Figure 5:
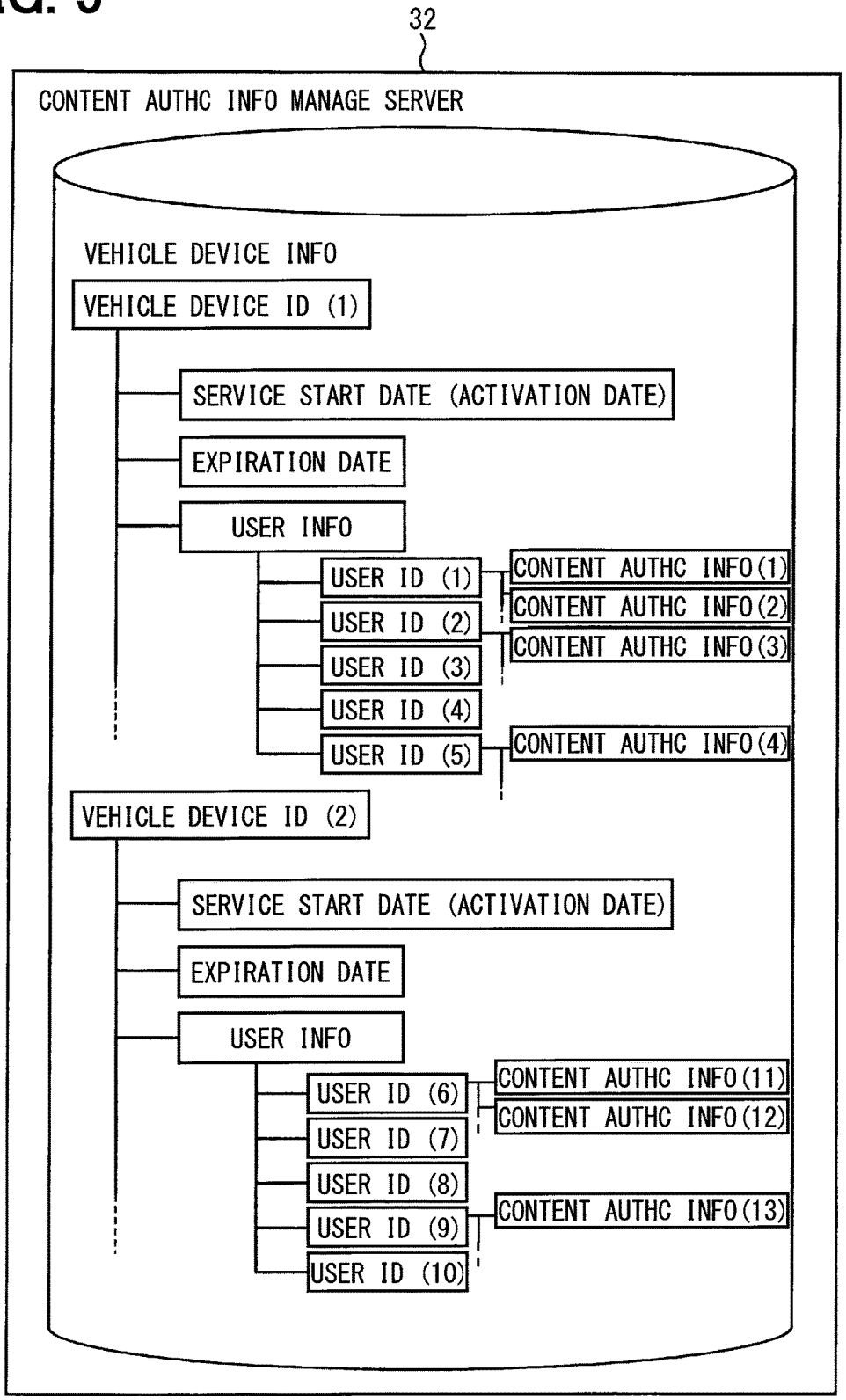
FIG. 5 is a diagram illustrating a data structure of vehicular device information managed by a content authentication information management server.

FIG. 5 exemplifies a data structure of the vehicular device information managed in the content authentication information management server 32 according to the above-mentioned configuration. The content authentication information management server 32 manages various types of information in association with the vehicular device ID (vehicular device identification information) of the vehicular device identified as a registered vehicular device. The information includes the service start date (activation date) of the content distribution service, the expiration date, the presence or absence of the availability flag, the cooperative application startup user ID (user identification information) registered in association with the registered vehicular device, and the content authentication information (user ID and password to start the content) registered in association with the user ID.

The content access server 33 functions as a relay server that relays data communication between the content execution device 12 and the content distribution server 11. As will be described later in detail, the content access server 33 provides the authenticated content execution device 12 with the content distribution service.

The content access server 33 virtually implements an authentication ticket data acquisition processor 81, a content authentication information determination processor 82, and a distribution permission processor 83 as software. For this purpose, a controller (not shown) to control entire operation of the content access server 33 executes a computer program.

The authentication ticket data acquisition processor 81 acquires authentication ticket data from the member information management server 31. This authentication ticket data equals the one the member information management server 31 supplies to the mobile communication terminal 122 using the authentication ticket data supply processor 51.

The content authentication information determination processor 82 determines a match between authentication ticket data supplied to the mobile communication terminal 122 included in the content execution device 12 and authentication ticket data acquired by the authentication ticket data acquisition processor 81. If both authentication ticket data match, the content authentication information determination processor 82 determines whether or not the content authentication information management server 32 contains (manages) the content authentication information (in this case, content startup user ID and password managed in association with the cooperative application startup user ID as the member information) managed in association with the authentication ticket data (namely, the member information input to the content execution device 12).

The distribution permission processor 83 permits distribution of contents to the content execution device 12 from the content distribution server 11 based on a result of authenticating the authentication ticket data acquired from the content execution device 12. Specifically, suppose a condition that the content authentication information determination processor 82 performs a confirmation process to confirm the presence of content authentication information managed in association with the member information (authentication ticket data supplied to the content execution device 12 corresponding to the member information) input to the content execution device 12. Suppose another condition that the content authentication information management server 32 allows the content execution device to use the content distribution service as will be described later in detail. If both conditions are satisfied, the distribution permission processor 83 permits (grants) to provide the content execution device 12 with the content distribution service. When permitted by the distribution permission processor 83, the content execution device 12 is authenticated to be capable of using the content distribution service.

Figure 6:
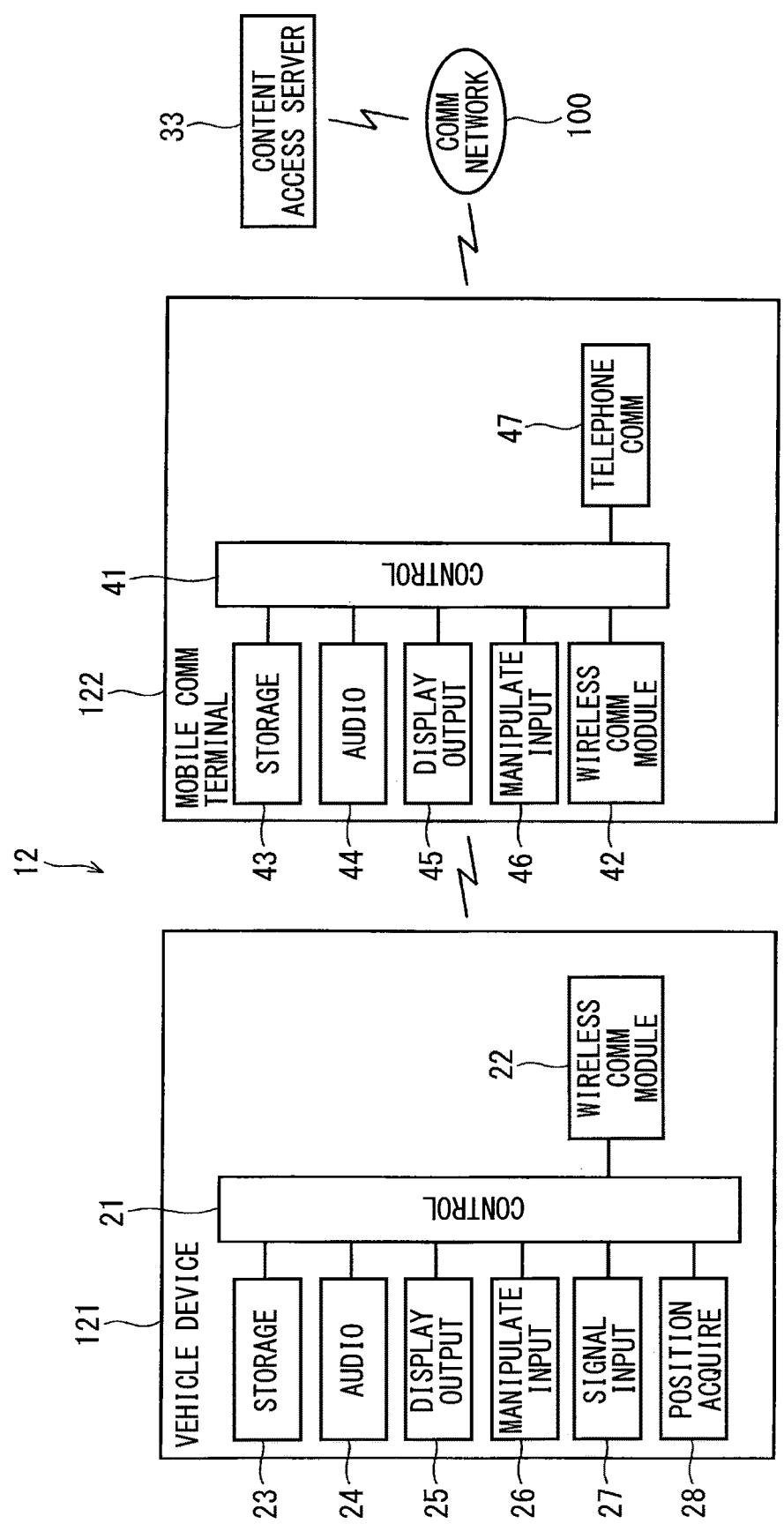
FIG. 6 is a diagram schematically illustrating configurations of a vehicular device and a mobile communication terminal included in a content execution device.

With reference to FIG. 6, the following describes configurations of the vehicular device 121 and the mobile communication terminal 122 included in the content execution device 12.

The vehicular device 121 includes a control portion 21, a wireless communication module 22, a storage portion 23, an audio processor 24, a display output portion 25, a manipulation input portion 26, a signal input portion 27, and a position acquisition portion 28. The control portion 21 includes a known microcomputer having a CPU, RAM, ROM, and an I/O bus (not shown). The control portion 21 controls entire operation of the vehicular device 121 according to a computer program stored in the ROM or the storage portion 23.

The wireless communication module 22 establishes a wireless communication line connected to a wireless communication module 42 included in the mobile communication terminal 122. The wireless communication module 22 variously communicates with the mobile communication terminal 122 using the communication line. The storage portion 23 includes a nonvolatile storage medium such as a hard disk drive. The storage portion 23 stores various computer programs and content programs, the cooperative application to provide a cooperative function to execute contents in cooperation with external devices, various programs such as a dedicated player (application) functioning as an operating system to execute the cooperative application, and data used for the programs. The vehicular device 121 is independently provided with the cooperative application and the dedicated player. The vehicular device 121 can independently execute various contents executable on the cooperative application.

The audio processor 24 connects with a microphone and a speaker (not shown) and provides a known audio input/output function. The audio processor 24 outputs an instruction to manipulate the vehicular device 121 to the control portion 21 based on sound input from the microphone. In addition, the audio processor 24 generates sound from the speaker based on instructions from the control portion 21 or the wireless communication module 22 and can thereby provide a handsfree function.

Figure 8A:
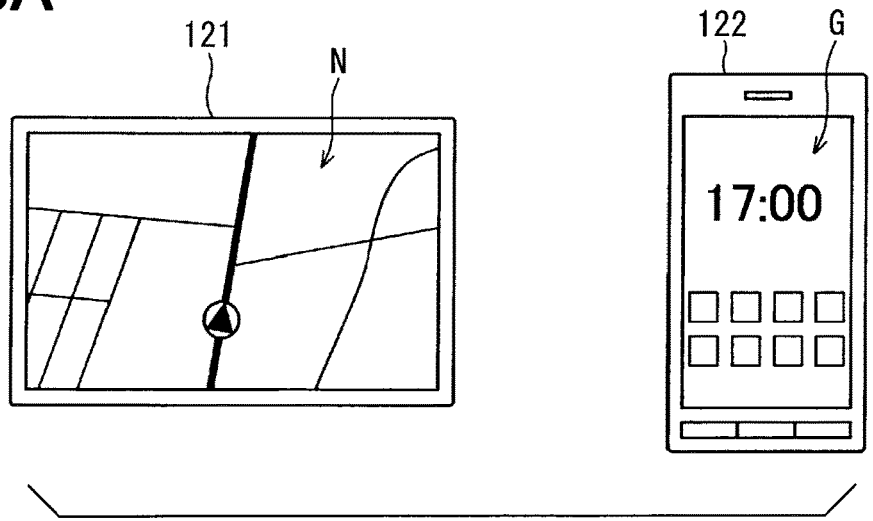
FIG. 8A is a diagram illustrating a condition before cooperation in a transitional screen state until a vehicular device and a mobile communication terminal are communicably connected to execute content.

The display output portion 25 includes a liquid crystal display or an organic EL display, for example. The display output portion 25 displays various types of information based on a display instruction signal from the control portion 21. A screen of the display output portion 25 is provided with a touch panel switch compliant with the pressure-sensitive type, the electromagnetic induction type, the capacitance type, or a combination of these according to known techniques. The display output portion 25 displays various screens such as a manipulation input screen (input interface) to input manipulation on contents, an output screen (output interface) to output execution of contents, and screen N for route guidance as illustrated in FIG. 8A, for example.

The manipulation input portion 26 includes various types of switches such as a touch panel switch provided on the screen of the display output portion 25 and a mechanical switch provided around the display output portion 25. The manipulation input portion 26 outputs a manipulation detection signal to the control portion 21 according to the user's manipulation on the switches. The control portion 21 analyzes the manipulation detection signal input from the manipulation input portion 26 to specify the user's manipulation and performs various processes based on the specified manipulation.

The signal input portion 27 connects to an ACC (accessory) switch (not shown) mounted on a vehicle and inputs an ACC signal output from the ACC switch to the control portion 21. The control portion 21 controls on/off operation of a power circuit (not shown) based on an on/off state of the input ACC signal. The control portion 21 turns on the power circuit when the ACC signal transitions into the on state from the off state. The control portion 21 turns off the power circuit when the ACC signal transitions into the off state from the on state.

The position acquisition portion 28 is provided with various sensors (not shown) such as a geomagnetism sensor, a gyroscope, a vehicle speed sensor, and a GPS receiver according to known techniques. The position acquisition portion 28 mutually complements detection signals supplied from the sensors to acquire the vehicle position information. The position acquisition portion 28 outputs the acquired vehicle position information to the control portion 21. The control portion 21 performs a navigation process based on the vehicle position information acquired by the position acquisition portion 28 and a guide route searched by a route search portion (not shown).

The configuration of the mobile communication terminal 122 will be described. The mobile communication terminal 122 includes a control portion 41, a wireless communication module 42, a storage portion 43, an audio processor 44, a display output portion 45, a manipulation input portion 46, and a telephone communication portion 47. The control portion 41 includes a known microcomputer having a CPU, RAM, ROM, and an I/O bus (not shown). The control portion 41 controls entire operation of the mobile communication terminal 122 according to a computer program stored in the ROM or the storage portion 43.

The wireless communication module 42 establishes a wireless communication line connected to a wireless communication module 22 included in the vehicular device 121. The wireless communication module 42 variously communicates with the vehicular device 121 using the communication line. The storage portion 43 includes a nonvolatile storage medium such as a memory card. The storage portion 43 stores various computer programs and content programs, the cooperative application to provide a cooperative function to execute contents in cooperation with external devices, various programs such as a dedicated player (application) functioning as an operating system to execute the cooperative application, and data used for the programs. The mobile communication terminal 122 is independently provided with the cooperative application and the dedicated player. The mobile communication terminal 122 can independently execute various contents executable on the cooperative application.

The audio processor 44 connects with a microphone and a speaker (not shown) and provides a known audio input/output function. The audio processor 44 outputs uttered voice input from the microphone to the control portion 41 and outputs received voice input from the control portion 41 to provide a telephone function. The audio processor 44 outputs an instruction to manipulate the mobile communication terminal 122 to the control portion 41 based on sound input from the microphone. In addition, the audio processor 44 generates sound from the speaker based on instructions from the control portion 41 or the wireless communication module 42 and can thereby provide a handsfree function.

The display output portion 45 includes a liquid crystal display or an organic EL display, for example. The display output portion 45 displays various types of information based on a display instruction signal from the control portion 41. A screen of the display output portion 45 is provided with a touch panel switch compliant with the pressure-sensitive type, the electromagnetic induction type, the capacitance type, or a combination of these according to known techniques. The display output portion 25 displays various screens such as ordinary menu screen G as illustrated in FIG. 8A, for example.

The manipulation input portion 46 includes various types of switches such as a touch panel switch provided on the screen of the display output portion 45 and a mechanical switch provided around the display output portion 45. The manipulation input portion 46 outputs a manipulation detection signal to the control portion 41 according to the user's manipulation on the switches. The control portion 41 analyzes the manipulation detection signal input from the manipulation input portion 46 to specify the user's manipulation and performs various processes based on the specified manipulation.

The telephone communication portion 47 establishes a wireless communication line connected to a communication network 100 and provides telephone communication using the communication line. In this case, the communication network 100 includes a mobile telephone base station or a base station controller (not shown), namely, a facility to provide mobile telephone communication services using known public line networks. The control portion 41 connects to the communication network 100 via the telephone communication portion 47. The control portion 41 is thereby capable of various data communications with the content distribution server 11 indirectly using the content access server 33 or directly without using the same.

The vehicular device 121 and the mobile communication terminal 122 are communicably connected to each other to establish a vehicle communication system. The vehicular device 121 and the mobile communication terminal 122 start respective cooperative applications to cooperatively execute various contents the mobile communication terminal 122 acquires from the content distribution server 11. The following describes how the vehicular device 121 and the mobile communication terminal 122 cooperate with each other to execute contents.

Figure 7:
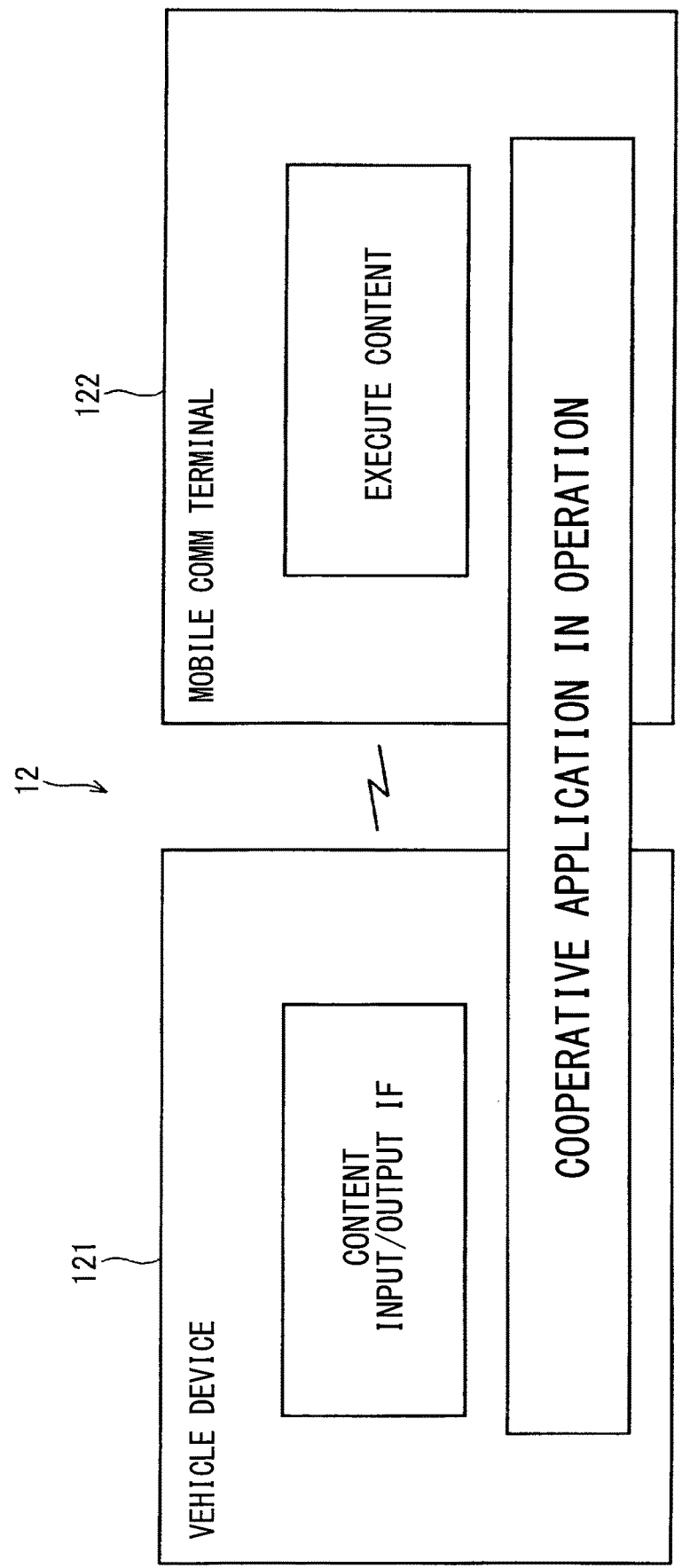
FIG. 7 is a diagram schematically illustrating how a vehicular device and a mobile communication terminal execute a content in cooperation with each other.

As illustrated in FIG. 7, the mobile communication terminal 122 is communicably connected to the vehicular device 121. The vehicular device 121 and the mobile communication terminal 122 start respective cooperative applications. The mobile communication terminal 122 executes its content program. The vehicular device 121 provides an input interface (input screen) and an output interface (output screen) for the content.

The mobile communication terminal 122 functions as a subject to execute the content program when the vehicular device 121 and the mobile communication terminal 122 start the respective cooperative applications. In this state, the mobile communication terminal 122 also functions as a communication medium between the vehicular device 121 and the content access server 33. To execute the content while the cooperative application is active, the mobile communication terminal 122 also transfers various data for the content between the vehicular device 121 and the content access server 33.

The following describes transition of screens to execute music content using the cooperative application after the vehicular device 121 and the mobile communication terminal 122 are communicably connected to each other.

Figure 8B:
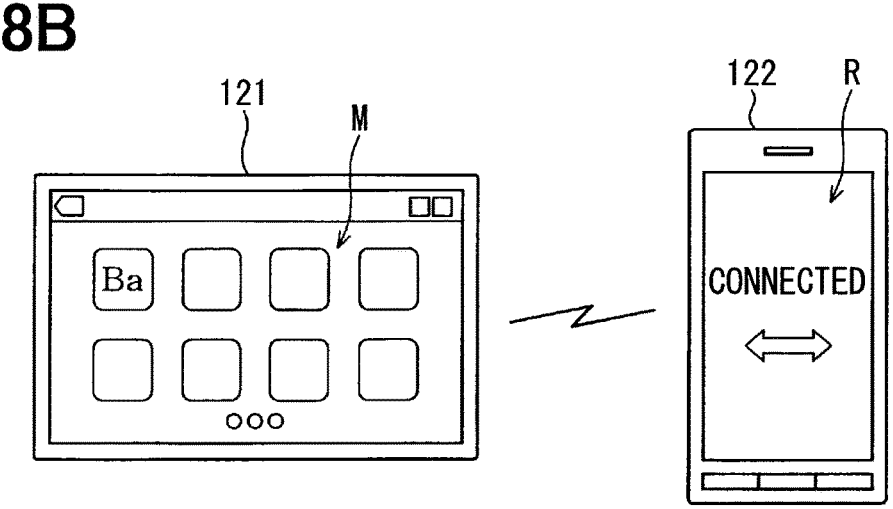
FIG. 8B is a diagram illustrating a menu screen of a cooperative application in a transitional screen state until a vehicular device and a mobile communication terminal are communicably connected to execute content.

The user manipulation starts a cooperative application provided for the vehicular device 121 that is communicably connected to the mobile communication terminal 122. The vehicular device 121 then allows its screen to transition into menu screen M of the cooperative application as illustrated in FIG. 8B. Menu screen M is provided with start button Ba to start the music content and other start buttons to start various contents. The user manipulation starts a cooperative application provided for the mobile communication terminal 122 that is communicably connected to the vehicular device 121. The mobile communication terminal 122 then displays a menu screen (not shown) of the cooperative application. The vehicular device 121 and the mobile communication terminal 122 each display the menu screen of the corresponding cooperative application. The user can manipulate the start button on either menu screen to start various contents. The mobile communication terminal 122 displays lock screen R as illustrated in FIG. 8B when either of the vehicular device 121 and the mobile communication terminal 122 starts the content. Displaying the lock screen R inhibits the mobile communication terminal 122 from using (manipulating) all contents. At this time, the cooperative application remains active on the mobile communication terminal 122. Contents are executed based on a content execution signal supplied from external devices or terminals.

Figure 8C:
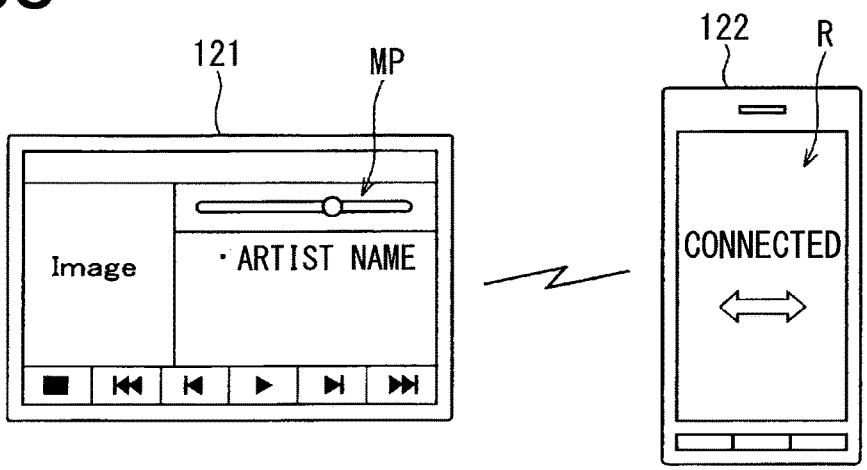
FIG. 8C is a diagram illustrating a screen to execute music content in a transitional screen state until a vehicular device and a mobile communication terminal are communicably connected to execute content.

The vehicular device 121 starts the music content in response to the user's manipulation of start button Ba and then transmits a signal to execute the music content to the mobile communication terminal 122. The mobile communication terminal 122 thereby executes the music content. The vehicular device 121 replays the music while displaying screen MP as illustrated in FIG. 8C to execute the music content based on music content output data received from the mobile communication terminal 122.

With reference to flowcharts, the following describes operation of the management system including the management server 10 according to the embodiment. In the following description, processes performed by the "content execution device 12" are actually performed by only the control portion 21 of the vehicular device 121, only the control portion 41 of the mobile communication terminal 122, or the control portion 21 and the control portion 41 in cooperation. A controller (not shown) to control entire operation of each server performs processes performed on the servers.

(Authentication Process by the Management System)

Figure 9:
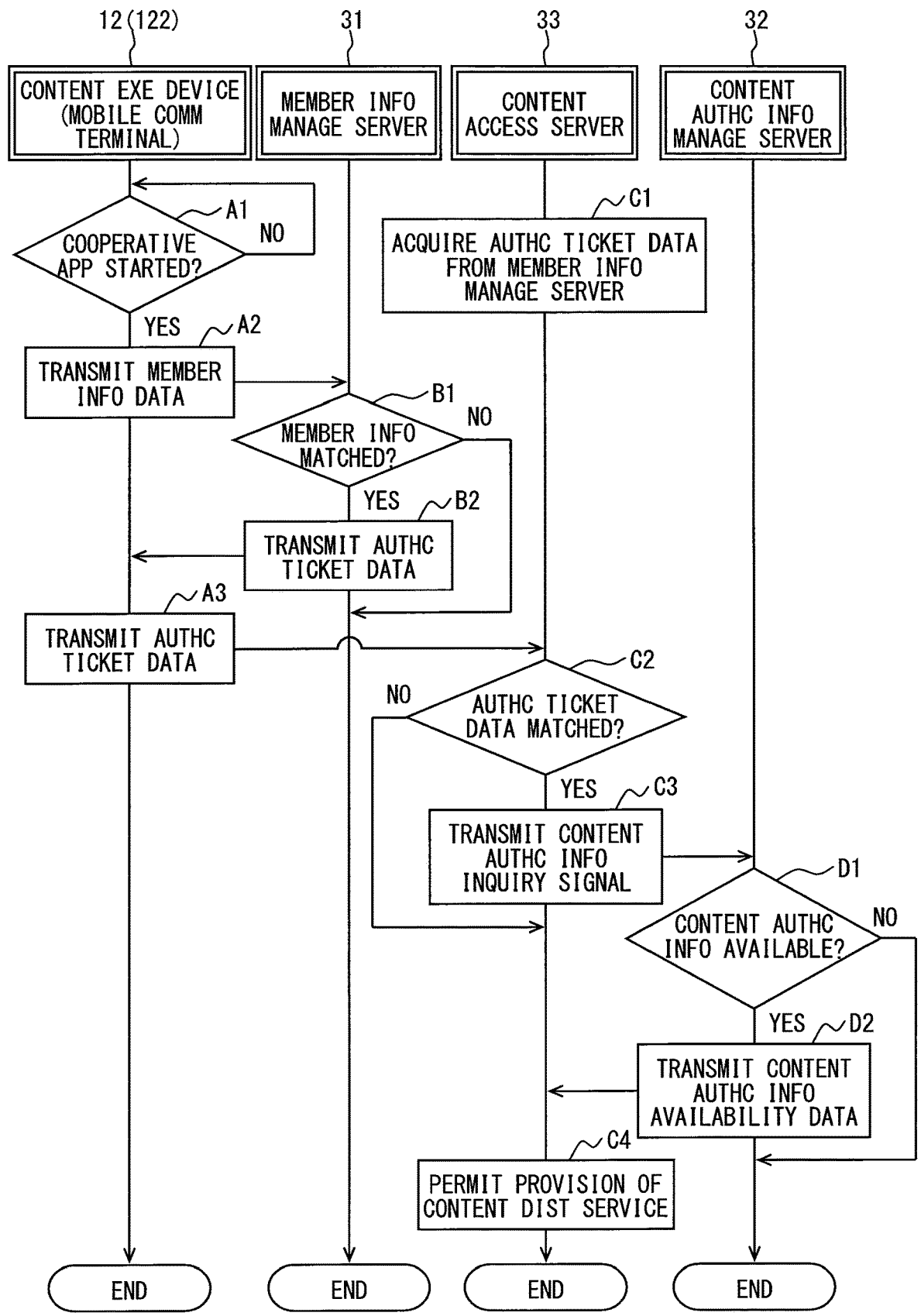
FIG. 9 is a flowchart illustrating an authentication process performed by a management system.

FIG. 9 illustrates an authentication process performed by the management system. The start button of the cooperative application is pressed on the content execution device 12 (YES at A1). The content execution device 12 then transmits member information data to the member information management server 31 (A2). The member information data is entered when the cooperative application starts. In the authentication process, the content execution device 12 need not necessarily allow the vehicular device 121 and the mobile communication terminal 122 to be communicably connected with each other. For example, only the vehicular device 121 or the mobile communication terminal 122 may be used. The following description mainly concerns operation of the mobile communication terminal 122 instead of the content execution device 12.

The member information management server 31 determines based on the member information data received from the mobile communication terminal 122 whether or not the member information managed by the member information management server 31 contains member information matching the member information input from the mobile communication terminal 122 (31). If the matching member information is available (YES at B1), the member information management server 31 transmits authentication ticket data to the mobile communication terminal 122 (B2). The mobile communication terminal 122 receives the authentication ticket data from the member information management server 31 and transmits the authentication ticket data to the content access server 33 (A3). In this case, the authentication ticket data is attached with various types of information (e.g., the member information entered to start the cooperative application) needed for the subsequent authentication.

Since the member information management server 31 allows the authentication ticket data supply processor 51 to supply the mobile communication terminal 122 with the authentication ticket data, the content access server 33 acquires this authentication ticket data from the member information management server 31 (C1). The content access server 33 receives the authentication ticket data from the mobile communication terminal 122. The content access server 33 then determines whether or not this authentication ticket data supplied to the mobile communication terminal 122 matches the authentication ticket data acquired from the member information management server 31 (C2). If both authentication ticket data match (YES at C2), the content access server 33 transmits a content authentication information inquiry signal to the content authentication information management server 32 (C3). The content authentication information inquiry signal inquires whether or not the content authentication information management server 32 contains the member information (cooperative application startup user ID) entered from the mobile communication terminal 122 when the cooperative application starts, in other words, the content authentication information that corresponds to the member information and is managed in association with the authentication ticket data supplied to the content execution device 12. The content access server 33 inquires of the content authentication information management server 32 whether or not the content authentication information management server 32 manages the content authentication information corresponding to the authentication ticket data supplied to the content execution device 12.

The content authentication information inquiry signal is attached with the authentication ticket data or the member information data attached to the authentication ticket data. The content authentication information management server 32 receives the content authentication information inquiry signal. The content authentication information management server 32 then determines whether or not the managed content authentication information contains the member information indicated by the member information data attached to the authentication ticket data, namely, the content authentication information corresponding to the member information (cooperative application startup user ID) entered from the mobile communication terminal 122 when the cooperative application starts (D1). If the pertinent content authentication information is available (YES at D1), the content authentication information management server 32 transmits content authentication information availability data indicating the determination result to the content access server 33 (D2).

The content access server 33 may receive the content authentication information availability data from the content authentication information management server 32. Namely, the content authentication information management server 32 may be confirmed to contain the content authentication information managed in association with the member information entered from the mobile communication terminal 122 when the cooperative application starts. In such a case, the content access server 33 allows the mobile communication terminal 122 to grant (permit) to provide the content distribution service for the content execution device 12 including the vehicular device 121 that executed a process (described later in detail) to make the content distribution service available (C4). The content access server 33 may not receive the content authentication information availability data from the content authentication information management server 32. Namely, the content authentication information management server 32 may not be confirmed to contain the content authentication information managed in association with the member information entered from the mobile communication terminal 122 when the cooperative application starts. In such a case, the content access server 33 does not permit provision of the content distribution service.

(Process by the Management System to Make the Content Distribution Service Available: Activation Process)

Figure 10:
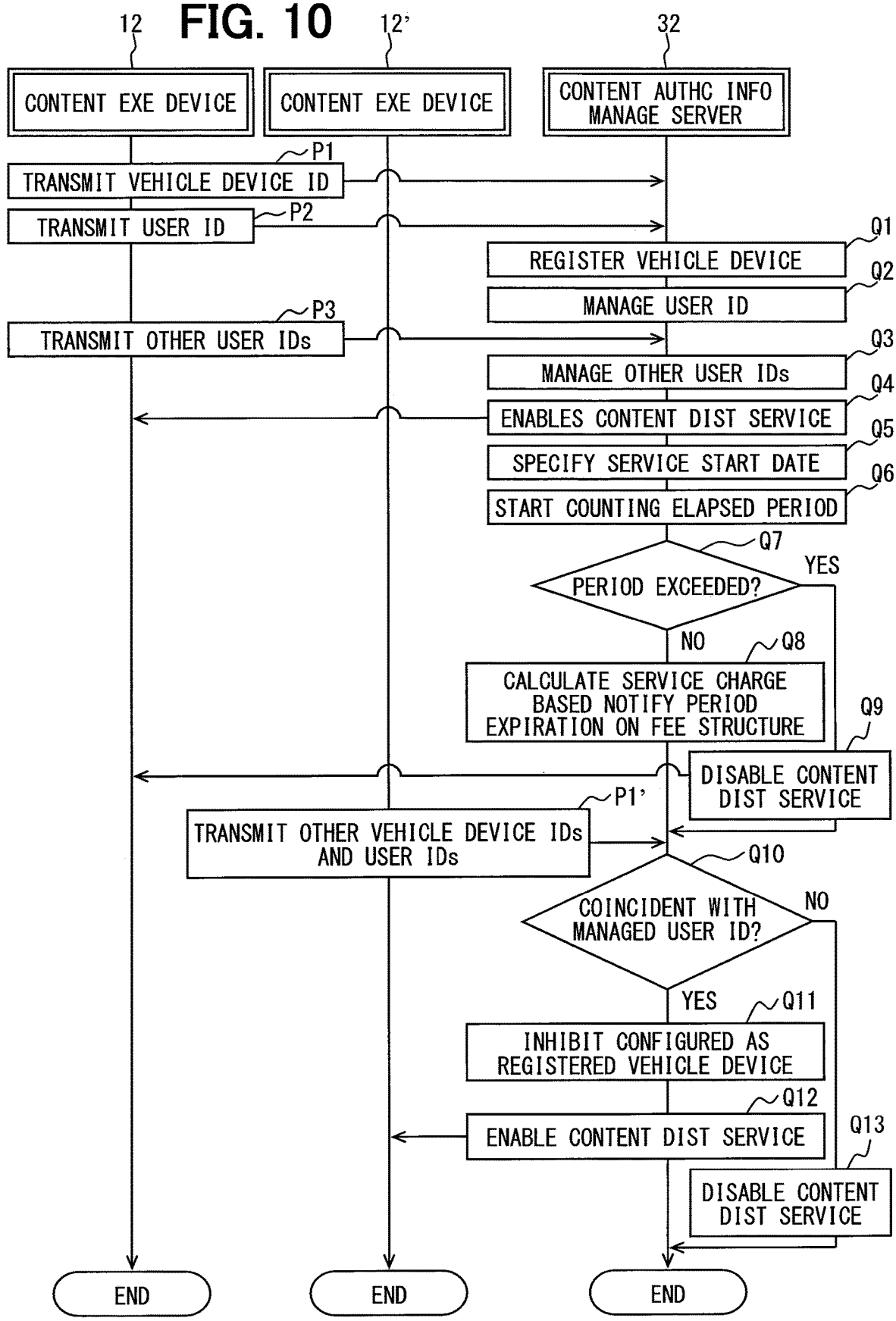
FIG. 10 is a flowchart illustrating an activation process performed by a management system.

An activation process as illustrated in FIG. 10 assumes that the above-mentioned permission process permits the content execution device 12 to be provided with the content distribution service. The content execution device 12 transmits a vehicular device ID to the content authentication information management server 32 via the mobile communication terminal 122 and the content access server 33 (P1). This vehicular device ID is assigned to the vehicular device 121 included in the content execution device 12 that started the cooperative application for the first time. The content execution device 12 transmits a cooperative application startup user ID to the content authentication information management server 32 via the mobile communication terminal 122 and the content access server 33 (P2). This cooperative application startup user ID was entered when the content execution device 12 started the cooperative application for the first time. The vehicular device 121 may be identified by a vehicular device ID received from the content execution device 12, namely, a vehicular device ID transmitted from the vehicular device 121 via the mobile communication terminal 122. The content authentication information management server 32 manages this vehicular device 121 as the registered vehicular device 121A capable of using the content distribution service (Q1). The content authentication information management server 32 manages a cooperative application startup user ID received from the content execution device 12, namely, transmitted from the vehicular device 121 via the mobile communication terminal 122, in association with the registered vehicular device 121A (vehicular device ID) (Q2).

A cooperative application startup user ID different from the registered user ID already transmitted to the content authentication information management server 32 may be entered after the content execution device 12 including the registered vehicular device 121A starts the cooperative application for the first time, namely, when the same starts the cooperative application for the second time or later. In such a case, the content execution device 12 transmits that user ID to the content authentication information management server 32 via the mobile communication terminal 122 and the content access server 33 (P3). The content authentication information management server 32 may receive a user ID different from the already registered user ID from the content execution device 12 including the registered vehicular device 121A. In such a case, the content authentication information management server 32 manages the received user ID in association with the vehicular device ID of the registered vehicular device 121A (Q3). The content authentication information management server 32 enables the content execution device 12 to use the content distribution service (Q4). The content access server 33 permits contents to be distributed to the content execution device enabled to use the content distribution service.

The content authentication information management server 32 can manage multiple user IDs, or five user IDs in this example, in association with one registered vehicular device 121A. A user ID different from the already registered user ID may be received from the content execution device 12 including the registered vehicular device 121A. In such a case, the content authentication information management server 32 may manage the received user ID afresh in association with the vehicular device ID of the registered vehicular device 121A under the condition that the number of user IDs managed in association with the vehicular device ID of the registered vehicular device 121A is smaller than a predetermined count.

The content authentication information management server 32 specifies a service start date of the content distribution service (Q5). The service start date signifies a day when the content execution device 12 including the registered vehicular device 121A starts the cooperative application for the first time, namely, a day when the content authentication information management server 32 starts managing (storing) a vehicular device ID and a cooperative application startup user ID received from the content execution device 12 including the registered vehicular device 121A. The content authentication information management server 32 starts counting a period elapsed from the specified service start date (Q6).

The content authentication information management server 32 determines whether or not the counted elapsed period exceeds a predetermined period (Q7). The counted elapsed period may not exceed the predetermined period (NO at Q7). In this case, the content authentication information management server 32 calculates a content distribution service charge based on a predetermined fee structure (Q8). This service charge is applied to the content execution device 12 including the registered vehicular device 121A or is applicable to the content distribution service for a user whose user ID is managed in association with the registered vehicular device 121A. The counted elapsed period may exceed the predetermined period (YES at Q7). In this case, the content authentication information management server 32 notifies the content execution device 12 of period expiration notification data (Q9).

The content authentication information management server 32 may receive a vehicular device ID and a user ID from a content execution device 12' (including a vehicular device different from the registered vehicular device 121A) different from the content execution device 12 including the registered vehicular device 121A (see P1'). In this case, the content authentication information management server 32 determines whether or not the user ID received from the content execution device 12' matches the already managed user ID (Q10). The user ID received from the content execution device 12' may match the already managed user ID (YES at Q10). Namely, the vehicular device included in the content execution device 12' may differ from the registered vehicular device 121A corresponding to the already managed user ID even if entering the already managed user ID allows the content execution device 12' to start the cooperative application. In this case, the content authentication information management server 32 inhibits the vehicular device included in the content execution device 12' from being configured as a registered vehicular device (Q11). The user ID received from the content execution device 12' may match the already managed user ID. In this case, the content authentication information management server 32 enables the content execution device 12' to use the content distribution service (Q12). In other words, the content authentication information management server 32 enables a content execution device to use the content distribution service if the content execution device transmitted the already managed user ID. This is valid even if a vehicular device included in the content execution device is not registered. The content access server 33 permits contents to be distributed to the content execution device enabled to use the content distribution service.

The user ID received from the content execution device 12' may not match the already managed user ID (NO at Q10). In this case, the content authentication information management server 32 disables the content execution device 12' from using the content distribution service (Q13). Namely, the content authentication information management server 32 disables the content execution device from using the content distribution service if the content execution device transmitted a user ID (unmanaged user ID) different from the already managed user ID and contains an unregistered vehicular device. The content access server 33 does not permit distribution of contents to the content execution device that is disabled to use the content distribution service.

(User ID Removal Process)

The management server 10 according to the above-mentioned configuration can remove the cooperative application startup user ID managed in the content authentication information management server 32 according to a removal request from the content execution device 12. This is a user ID removal process that is described below. The following description assumes a case of removing a user ID based on manipulation from the mobile communication terminal 122.

Figure 11:
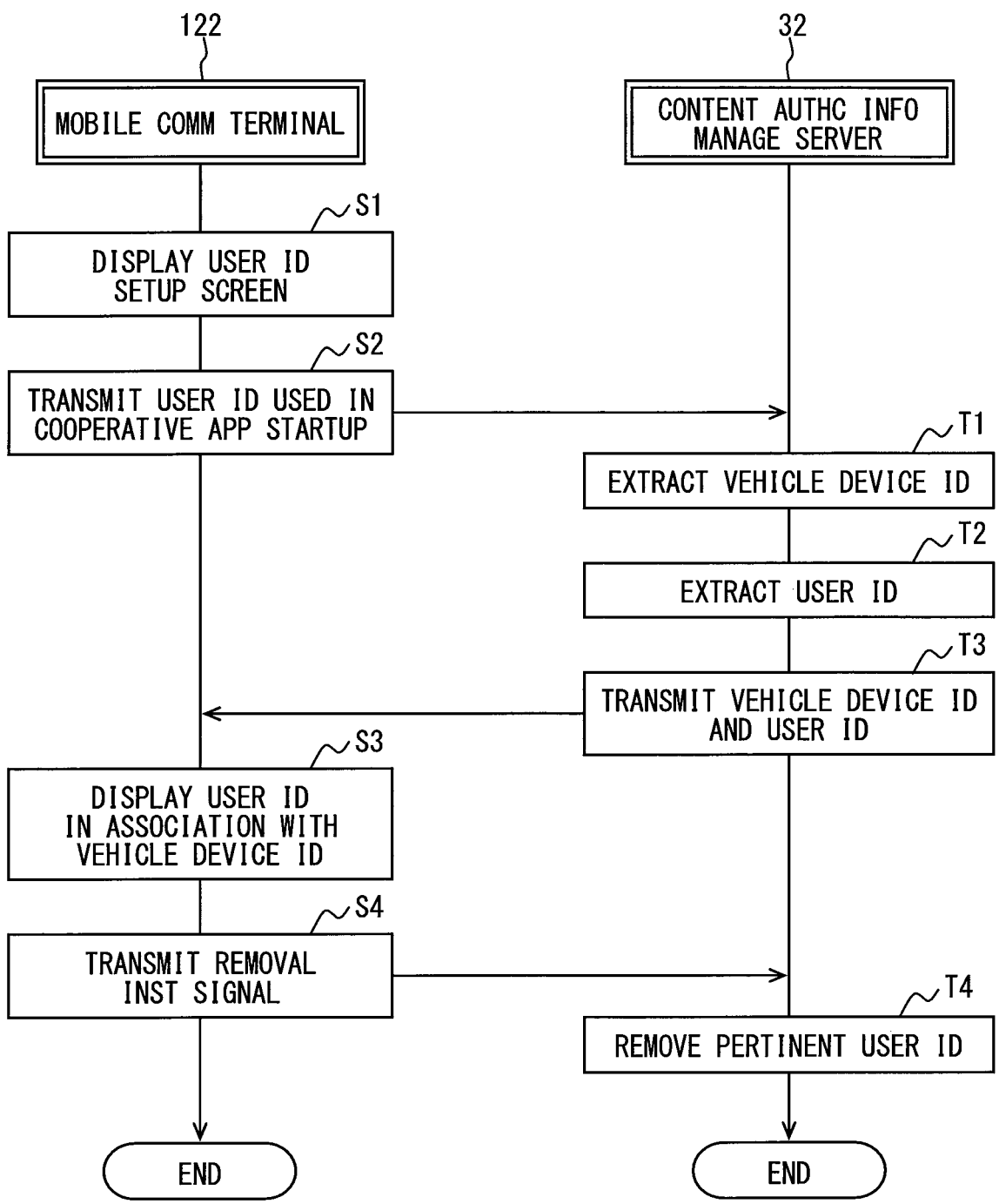
FIG. 11 is a flowchart illustrating a user ID removal process performed by a management system.
Figure 12A:
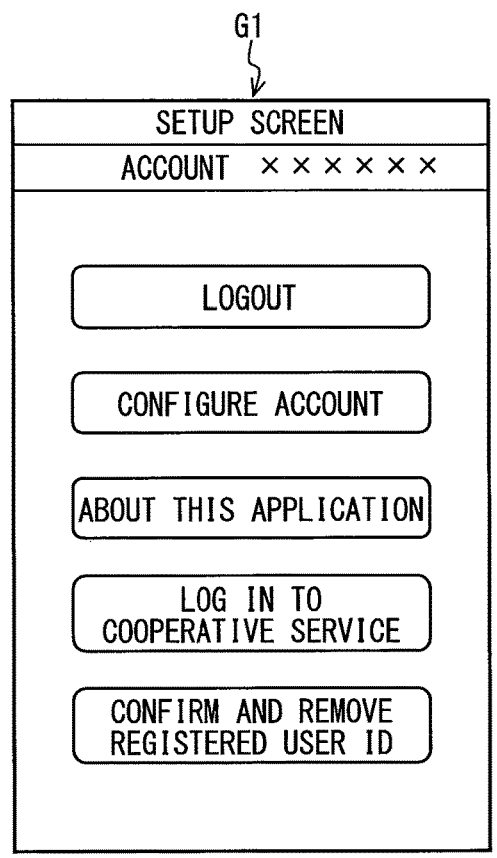
FIG. 12A is a diagram illustrating a user ID setup screen.

As illustrated in FIG. 11, the mobile communication terminal 122 transitions into user ID setup screen G1 as illustrated in FIG. 12A from the cooperative application's menu screen (not shown) according to the user manipulation (S1). The mobile communication terminal 122 transmits the cooperative application startup user ID to the content authentication information management server 32 (S2). This cooperative application startup user ID is entered when the cooperative application starts. The content authentication information management server 32 extracts a vehicular device ID (assigned to a specified vehicular device) associated with the cooperative application startup user ID received from the mobile communication terminal 122 (T1). The content authentication information management server 32 extracts all cooperative application startup user IDs managed in association with that vehicular device ID (T2). The content authentication information management server 32 transmits the vehicular device ID and the cooperative application startup user IDs extracted as described above to the mobile communication terminal 122 (T3).

Figure 12B:
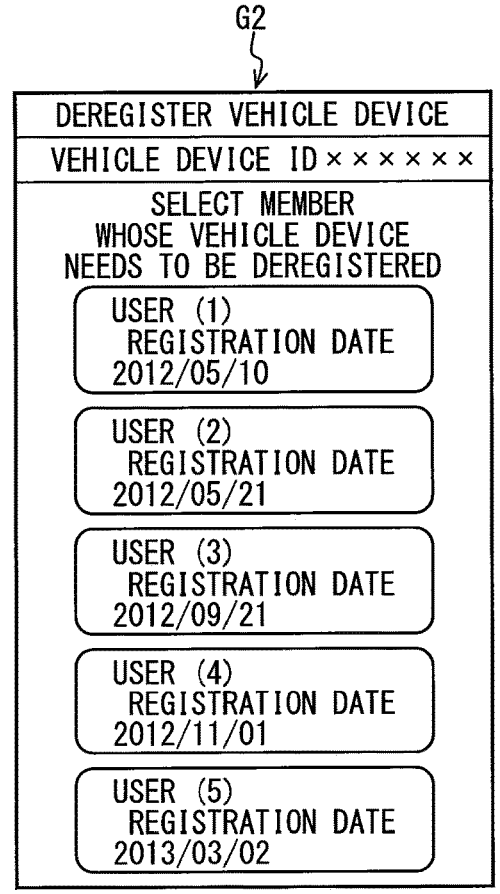
FIG. 12B is a diagram illustrating a user ID removal screen.

When a "confirm and remove the registered user ID" button is pressed on user ID setup screen G1, the mobile communication terminal 122 allows the screen to transition into user ID listing screen G2 as illustrated in FIG. 12B (S3). User ID listing screen G2 displays a cooperative application startup user ID associated with the received vehicular device ID. The mobile communication terminal 122 displays user IDs in association with the vehicular device ID so that touch manipulation can select each user ID. In this case, the mobile communication terminal 122 may display user IDs one by one or at a time so as to be selectable. When a removal button (not shown) on the screen is pressed, the mobile communication terminal 122 transmits a user identification information removal instruction signal to the content authentication information management server 32 (S4). This user identification information removal instruction signal instructs removal of the user ID that is selected at the time. The user identification information removal instruction signal instructs removal of all user IDs selected when this signal is transmitted. Based on the removal instruction signal received from the mobile communication terminal 122, the content authentication information management server 32 removes the pertinent user ID, namely, the user ID that is selected on the content execution device 12 (mobile communication terminal 122) when the user identification information removal instruction signal is transmitted (T4).

The content authentication information management server 32 may attempt to register more user IDs than the predetermined count corresponding to one vehicular device ID. In such a case, the removal process may allow the content authentication information management server 32 to notify the mobile communication terminal 122 that no more user IDs can be registered. This can prompt the user to perform the user ID removal process if he or she attempts to register more user IDs than the predetermined count.

In the management server 10 according to the embodiment as described above, user a may start a cooperative application for the first time on the content execution device including vehicular device A (e.g., purchased by user a). User a can define vehicular device A as a registered vehicular device and register his or her user ID in association with the registered vehicular device.

The content execution device may thereafter transmit a user ID that matches the registered user ID (managed by the user identification information management processor 62). In such a case, the content execution device is permitted to be eligible for provision of the content distribution service regardless of whether or not the vehicular device included in the content execution device is registered. Namely, user a identified by the user ID managed in association with the vehicular device ID of vehicular device A can use the content distribution service using vehicular device B even if the user ID is not managed in association with the vehicular device ID of vehicular device B different from vehicular device A. In other words, user a can use the content distribution service also using vehicular device B even if vehicular device B does not perform the activation process, namely, is not activated.

User a needs to at least once register (activate) his or her user ID using vehicular device A he or she purchased (e.g., a vehicular device mounted on his or her private vehicle) or using the content execution device including vehicular device A. After that, user a can use the content distribution service also using the content execution device including unregistered vehicular device B (e.g., mounted on a rent-a-car, a taxi, or a bus other than his or her private vehicle). User a need not afresh register the use of the content distribution service using unregistered vehicular device B or using the content execution device including unregistered vehicular device B. This can improve convenience of the content distribution service to be used by users who purchases the vehicular device included in the content execution device.

The management system including the management server 10 provides the predetermined count to limit the number of user IDs the content authentication information management server 32 manages in association with one vehicular device ID. For example, user IDs can be removed as needed if the number of user IDs managed in association with one vehicular device ID exceeds the predetermined count. This can appropriately adjust the number of user IDs to be managed.

The number of users capable of using the service can be appropriately limited since the number of user IDs (capable of permitting the use of the service) managed in association with one vehicular device ID is limited to the predetermined count. Manipulation (instruction) from the vehicular device 121 or the mobile communication terminal 122 can remove user IDs regardless of whether or not the number of managed user IDs exceeds the predetermined count. For example, the owner of a vehicular device may change after a vehicle mounted with the vehicular device is sold as a used vehicle. In such a case, the owner can remove the already managed user ID and register his or her own new user ID.

The disclosure is not limited to the above-mentioned embodiment but is applicable to various embodiments. For example, the disclosure can be modified or enhanced as follows.

The content authentication information management server 32 and the content access server 33 may be configured as a single server.

A server other than the content authentication information management server 32 may be provided with the registered vehicular device enabling processor 61, the user identification information management processor 62, the registered vehicular device disabling processor 63, the service enabling processor 64, the user identification information removal processor 65, the service start date identification processor 66, the elapsed period count processor 67, the service charge calculation processor 68, and the period expiration notification processor 69.

The management server 10 may be capable of performing modified processes 1 through 7 described below according to cooperation between the content access server 33 and the content authentication information management server 32.

(Modified Process 1)

The content authentication information management server 32 may not store a vehicular device ID or a user ID transmitted from the vehicular device 121 via the mobile communication terminal 122. In such a case, the management server 10 stores the vehicular device ID in the content authentication information management server 32. The management server 10 stores the user ID in association with the vehicular device ID in the content authentication information management server 32. The management server 10 permits the user identified by the user ID to be eligible for provision of the content distribution service using the vehicular device 121 (registered or not). The management server 10 assumes that the permission has started provision of the content distribution service to the vehicular device 121.

(Modified Process 2)

The content authentication information management server 32 may store a vehicular device ID transmitted from the vehicular device 121 via the mobile communication terminal 122. At the same time, the content authentication information management server 32 may not store a user ID transmitted from the vehicular device 121 via the mobile communication terminal 122. In such a case, the management server 10 allows the content authentication information management server 32 to store the user ID in association with the already stored vehicular device ID. The management server 10 permits the user identified by the user ID to be eligible for provision of the content distribution service using the vehicular device 121 (registered or not).

(Modified Process 3)

The content authentication information management server 32 may store the vehicular device ID and the user ID transmitted from the vehicular device 121 via the mobile communication terminal 122. In such a case, the management server 10 permits the user identified by the user ID to be eligible for provision of the content distribution service using the vehicular device 121 (registered or not). In this case, the user ID may be stored in association with the vehicular device ID of a vehicular device different from the vehicular device 121 identified by the received vehicular device ID. Nevertheless, the management server 10 permits the user identified by the user ID to be eligible for provision of the content distribution service using the vehicular device 121 (registered or not).

(Modified Process 4)

In such a case, the management server 10 permits the user identified by the user ID to be eligible for provision of the content distribution service using a registered vehicular device and an unregistered vehicular device. The unregistered vehicular device signifies a vehicular device that differs from a registered vehicular device and is not registered in the content authentication information management server 32.

(Modified Process 5)

The content authentication information management server 32 may not store the user ID transmitted from the vehicular device 121 via the mobile communication terminal 122. In such a case, the content execution device 12 stores the user ID in association with a vehicular device ID (any vehicular device ID) stored in the content authentication information management server 32. The management server 10 permits the user identified by the user ID to be eligible for provision of the content distribution service using the vehicular device 121 (registered or not).

(Modified Process 6)

The content authentication information management server 32 may store the user ID transmitted from the vehicular device 121 via the mobile communication terminal 122 in association with any vehicular device ID. The management server 10 permits the user identified by the user ID to be eligible for provision of the content distribution service using the vehicular device 121 (registered or not) without storing the user ID afresh in the content authentication information management server 32.

(Modified Process 7)

When the user ID and the vehicular device ID are transmitted from the vehicular device 121 via the mobile communication terminal 122, the content authentication information management server 32 may not store the user ID but may store the vehicular device ID. In such a case, the management server 10 further performs the following processes.

The number of user IDs already stored in the content authentication information management server 32 in association with the received vehicular device ID may not reach a predetermined count (e.g., five). In such a case, the management server 10 allows the content authentication information management server 32 to store the received user ID in association with the vehicular device ID. Further, the management server 10 permits the user identified by the user ID to be eligible for provision of the content distribution service using the vehicular device 121 (registered or not). The number of user IDs already stored in the content authentication information management server 32 in association with the received vehicular device ID may reach the predetermined count. In such a case, the management server 10 does not permit the user identified by the user ID to be eligible for provision of the content distribution service using the vehicular device 121.

The management server 10 may be capable of performing modified processes 8 through 10 described below as regards the user ID removal process.

(Modified Process 8)

The management server 10 (user identification information removal processor 65) may remove specified user IDs (specified as removal targets by a received user identification information removal instruction signal) one by one out of cooperative application startup user IDs managed by the user identification information management processor 62 based on the user identification information removal instruction signal transmitted from the content execution device 12.

(Modified Process 9)

The management server 10 (user identification information removal processor 65) may collectively remove multiple cooperative application startup user IDs (specified as removal targets by a received user identification information removal instruction signal) managed by the user identification information management processor 62.

(Modified Process 10)

The management server 10 (user identification information removal processor 65) may simultaneously remove all cooperative application startup user IDs that belong to user IDs managed by the user identification information management processor 62 and are stored in association with a specified vehicular device ID. The cooperative application startup user ID is specified as a removal target by the received user identification information removal instruction signal and is stored in association with the vehicular device ID of a vehicular device specified by the received user identification information removal instruction signal. In this case, the user identification information removal instruction signal contains information to specify the vehicular device ID as a removal target as well as information to specify the user ID as a removal target.

According to the embodiment, the mobile communication terminal 122 performs a content program itself. This can reduce a processing load on the vehicular device 121. Therefore, the vehicular device 121 can reliably perform other processes including highly loaded processes such as operation control according to vehicle travel situations. For example, the highly loaded processes include a travel regulation process that forces a running vehicle to regulate content manipulation or output from the vehicular device 121.

There have been described the examples of using the navigation system as the vehicular device 121 but the present disclosure is not limited thereto. For example, the vehicular device may be available as a device installed with an application program having the guidance function. The vehicular device may be also available as a portable wireless device attachable or detachable from the vehicle, for example, in addition to an onboard device built into the vehicle.

The vehicular device 121 and the mobile communication terminal 122 may be communicably connected to each other via a wired communication line. The content execution device 12 need not necessarily include both the vehicular device 121 and the mobile communication terminal 122 but may include only the vehicular device 121 or the mobile communication terminal 122 or may include another device or terminal only. The content execution device 12 may be available as a combination of the vehicular device 121 and the mobile communication terminal 122 plus another device or terminal.

In the drawings, reference numeral 10 denotes the management server; 12 denotes the content execution device; 121 denotes the vehicular device; 122 denotes the mobile communication terminal; 61 denotes the registered vehicular device enabling processor (exemplifying a registered vehicular device enabling means and a registered vehicular device enabling portion); 62 denotes the user identification information management processor (exemplifying a user identification information management means and a user identification information management portion); and 65 denotes the user identification information removal processor (exemplifying a user identification information removal means and a user identification information removal portion).

While there have been exemplified the embodiments and configurations according to the present disclosure, embodiments and configurations according to the disclosure are not limited to the above-mentioned embodiments and configurations. The scope of the embodiments and configurations according to the disclosure also includes embodiments and configurations resulting from appropriately combining different embodiments and configurations with the disclosed technical elements.

The invention claimed is:

1. A system comprising:
a content execution device located in a vehicle and including a navigation system device and a mobile communication terminal provided separately from each other;
a management server including a content access server and a content authentication information management server;
a content distribution device;
the management server managing provisions for the content execution device located in the vehicle;
the navigation system device and the mobile communication terminal both having a cooperative application installed which executes content based on mutual cooperation with each other, the content being acquired by the mobile communication terminal from the content distribution device through the content access server based on a user request, the navigation system device and the mobile communication terminal each executing the cooperative application to cooperatively execute the content, and, while the navigation system device and the mobile communication terminal each execute the cooperative application to cooperatively execute the content, the mobile communication terminal also functions as a communication medium between the navigation system device and the content access server; and
the content authentication information management server including:
a registered vehicular device enabling portion that configures the navigation system device included in the content execution device as a registered vehicular device when the content execution device, including the navigation system device and the mobile communication terminal provided separately from each other and each installed with the cooperative application for executing the content based on the mutual cooperation with each other, starts the cooperative application for the first time; and
a user identification information management portion that manages user identification information in association with vehicular device identification information of the registered vehicular device, identifying the registered vehicular device, the user identification information being registered only with the associated vehicular device identification information when the content execution device including the registered vehicular device starts the cooperative application for the first time and transmits the user identification information and the associated vehicular device identification information to the user identification information management portion of the content authentication information management server;
wherein the management server permits the provision of a content distribution service for the content execution device by the content distribution device when the user identification information transmitted from the content execution device matches the user identification information managed by the user identification information management portion regardless of whether the navigation system device included in the content execution device is the registered vehicular device.

2. The system according to claim 1, wherein:
when the user identification information received from the content execution device including the registered vehicular device differs from the managed user identification information, the user identification information management portion manages the received user identification information in association with the vehicular device identification information of the registered vehicular device.

3. The system according to claim 2, wherein:
when the user identification information received from the content execution device including the registered vehicular device differs from the managed user identification information, the user identification information management portion manages the received user identification information in association with the vehicular device identification information of the registered vehicular device under a condition where a total number of user identification information managed in association with the vehicular device identification information of the registered vehicular device does not reach a predetermined count.

4. The system according to claim 1, further comprising:
a user identification information removal portion of the content authentication information management server that removes the user identification information managed by the user identification information management portion in response to a removal request from the content execution device.

5. The system according to claim 4, wherein:
the user identification information removal portion removes the user identification information selected in the content execution device.

6. The system according to claim 1, wherein the management server permits the provision of the content distribution service without the use of a vehicle identification.

7. The system according to claim 1, wherein the management server permits the provision of the content distribution service based only on the user identification of the registered vehicular device.

8. The system according to claim 1, wherein the content distribution service provided by the content distribution device for the content execution device includes distributing streaming music content to the content execution device.

9. The system according to claim 1, wherein the content distribution service provided by the content distribution device for the content execution device includes distributing non-streaming search content to the content execution device, the non-streaming search content including at least one of facility search content for searching restaurants or tourist facilities, new distribution content, and social networking service content.

10. The system according to claim 1, wherein the cooperative application of the navigation system device and the cooperative application of the mobile communication terminal are configured to execute the content based on mutual cooperation with each other by the mobile communication terminal transferring data for the content between the navigation system device and the content distribution service.

11. The system according to claim 10, wherein the cooperative application of the navigation system device and the cooperative application of the mobile communication terminal each display a menu screen of the respective cooperative application and a user can execute a start button on the menu screen of either cooperative application to start execution of the content.

12. A system comprising:
a content execution device located in a vehicle and including a first navigation system device, a second navigation system device, and a mobile communication terminal provided separately from each other;
a management server including a content access server and a content authentication information management server;
a content distribution device;
the management server managing provisions for the content execution device located in the vehicle;
the first navigation system device and the mobile communication terminal both having a cooperative application installed which executes content based on mutual cooperation with each other, the content being acquired by the mobile communication terminal from the content distribution device through the content access server based on a user request, the navigation system device and the mobile communication terminal each executing the cooperative application to cooperatively execute the content, and, while the first navigation system device and the mobile communication terminal each execute the cooperative application to cooperatively execute the content, the mobile communication terminal also functions as a communication medium between the first navigation system device and the content access server; and the content authentication information management server including:
a registered vehicular device enabling portion that configures the first navigation system device included in the content execution device as a registered vehicular device when the content execution device, including the first navigation system device and the mobile communication terminal, starts the cooperative application for the first time; and
a user identification information management portion that manages user identification information in association with vehicular device identification information of the registered vehicular device, identifying the registered vehicular device, the user identification information being registered only with the associated vehicular device identification information when the content execution device including the registered vehicular device starts the cooperative application for the first time and transmits the user identification information and the associated vehicular device identification information to the user identification information management portion of the content authentication information management server;
wherein the management server permits the provision of a content distribution service for the content execution device by the content distribution device when the user identification information transmitted from the content execution device matches the user identification information managed by the user identification information management portion regardless of whether the second navigation system device is included in the content execution device.

13. The system according to claim 12, wherein the management server permits the provision of the content distribution service without the use of a vehicle identification.

14. The system according to claim 12, wherein the management server permits the provision of the content distribution service based only on the user identification of the registered vehicular device.

* * * * *